US012596752B2

(12) United States Patent
Nishimoto et al.

(10) Patent No.: US 12,596,752 B2
(45) Date of Patent: Apr. 7, 2026

(54) INFORMATION PROCESSING APPARATUS, CONTENT GENERATION SYSTEM, AND CONTROL METHOD

(71) Applicant: NEC Corporation, Tokyo (JP)

(72) Inventors: Shinnosuke Nishimoto, Tokyo (JP); Masahiro Serizawa, Tokyo (JP); Masahiro Iwadare, Tokyo (JP); Akio Yoshioka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/911,562

(22) Filed: Oct. 10, 2024

(65) Prior Publication Data

US 2025/0139170 A1     May 1, 2025

(30) Foreign Application Priority Data

Oct. 27, 2023    (JP) ................................. 2023-185036

(51) Int. Cl.
*G06F 16/903*          (2019.01)
(52) U.S. Cl.
CPC ............................. *G06F 16/90335* (2019.01)
(58) Field of Classification Search
None
See application file for complete search history.

(56) References Cited

U.S. PATENT DOCUMENTS

| | | | | |
|---|---|---|---|---|
| 8,296,257 B1 * | 10/2012 | Chavira | .................. | G06F 16/35 |
| | | | | 706/62 |
| 2012/0109993 A1 * | 5/2012 | Reznik | .................. | G06F 16/583 |
| | | | | 707/765 |
| 2024/0311405 A1 * | 9/2024 | Kim | ..................... | G06F 16/3329 |
| 2024/0320433 A1 * | 9/2024 | Lott | ...................... | G06F 40/284 |
| 2024/0356807 A1 * | 10/2024 | Venugopal | .......... | H04L 41/0894 |
| 2024/0370708 A1 * | 11/2024 | Raghavan | .............. | G06N 3/044 |

FOREIGN PATENT DOCUMENTS

| | | |
|---|---|---|
| JP | H04-213258 A | 8/1992 |
| JP | 2001-142891 A | 5/2001 |
| JP | 2002-135452 A | 5/2002 |
| JP | 2009-113601 A | 5/2009 |
| JP | 2016-133846 A | 7/2016 |
| JP | 2019-016050 A | 1/2019 |
| JP | 2019-091387 A | 6/2019 |
| JP | 2021-139921 A | 9/2021 |
| JP | 2022-131995 A | 9/2022 |

* cited by examiner

*Primary Examiner* — Richard L Bowen
(74) *Attorney, Agent, or Firm* — Sughrue Mion, PLLC

(57) ABSTRACT
Use of two types of machine-learned generative models is optimized. An information processing apparatus includes: an accepting section which accepts an input of a query; a determining section which determines a generative model that is among a first generative model included in the information processing apparatus and a second generative model included in another apparatus and that is to be caused to generate content in accordance with the query; and a presenting section which presents, to a user, the content generated according to determination by the determining section.

7 Claims, 10 Drawing Sheets

1

INFORMATION PROCESSING APPARATUS

101

ACCEPTING SECTION

102

DETERMINING SECTION

103

PRESENTING SECTION

START

ACCEPT INPUT OF QUERY ~ S1

DETERMINE GENERATIVE MODEL THAT IS TO BE CAUSED TO GENERATE CONTENT ~ S2

PRESENT GENERATED CONTENT ~ S3

END

INFORMATION PROCESSING APPARATUS, CONTENT GENERATION SYSTEM, AND CONTROL METHOD

CROSS REFERENCE TO RELATED APPLICATIONS

This application is based upon and claims the benefit of priority from Japanese Patent Application No. 2023-185036 filed on Oct. 27, 2023, the disclosure of which is incorporated herein in its entirety by reference.

TECHNICAL FIELD

The present disclosure relates to an information processing apparatus, a content generation system, and a control method.

BACKGROUND ART

Techniques are known for generating content with use of a machine-learned generative model (also referred to as a generative artificial intelligence (AI)). For example, Patent Literature 1 below discloses a terminal for generating, via an automatically responding AI, a response to what a user says and notifying the user of the response.

CITATION LIST

Patent Literature

Patent Literature 1
   Japanese Patent Application Publication Tokukai No. 2019-91387

SUMMARY OF INVENTION

Technical Problem

In techniques for generating content with use of a generative model, including automatically responding AI disclosed in Patent Literature 1, it is common to cause not an information processing apparatus used by a user but a server to generate content. Use of a server provides an advantage of making it possible to generate highly accurate content with use of abundant computer resources.

However, a case of causing a server to generate content provides a disadvantage such that waiting time occurs during a period from a time at which a user inputs, to an information processing apparatus, a query to instruct generation of content until a time at which generated content is presented to the user. Further, the case of causing a server to generate content can be said to provide another disadvantage such that it is originally impossible to generate content in a state in which an information processing apparatus cannot communicate with the server.

Such disadvantages as described above can be overcome by providing a generative model in an information processing apparatus. However, in a case where a generative model provided in an information processing apparatus is used, such an advantage as described above cannot be enjoyed. An example object of the present disclosure is to provide a technique for making it possible to optimize use of two types of generative models, i.e., a generative model included in an information processing apparatus and a generative model included in another apparatus.

Solution to Problem

An information processing apparatus in accordance with an example aspect of the present disclosure includes at least one processor, the at least one processor carrying out: an accepting process of accepting an input of a query; a determining process of determining a generative model that is among a first generative model included in the information processing apparatus and a second generative model included in another apparatus and that is to be caused to generate content in accordance with the query; and a presenting process of presenting, to a user, the content generated according to determination in the determining process.

A content generation system in accordance with an example aspect of the present disclosure includes: a first apparatus including a first generative model; and a second apparatus including a second generative model, the first apparatus determining a generative model that is among the first generative model and the second generative model and that is to be caused to generate content in accordance with a query inputted to the content generation system, and presenting, to a user, the content generated according to determination by the first apparatus.

In a control method in accordance with an example aspect of the present disclosure, at least one processor carries out: an accepting process of accepting an input of a query; a determining process of determining a generative model that is among a first generative model and a second generative model and that is to be caused to generate content in accordance with the query; and a presenting process of presenting, to a user, the content generated according to determination in the determining process.

Advantageous Effects of Invention

An example aspect of the present disclosure provides an example advantage of making it possible to optimize use of two types of generative models, i.e., a generative model included in an information processing apparatus and a generative model included in another apparatus.

BRIEF DESCRIPTION OF DRAWINGS

FIG. 3 is a block diagram illustrating a configuration of a content generation system in accordance with the present disclosure.

FIG. 4 is a representation of an outline of another content generation system in accordance with the present disclosure.

EXAMPLE EMBODIMENTS

Figures 1, 2:
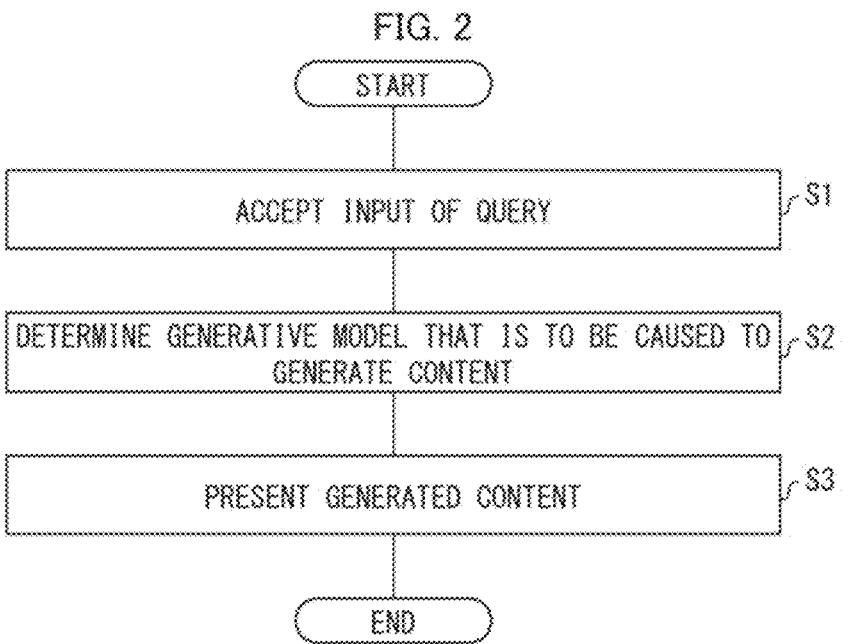
FIG. 1 is a block diagram illustrating a configuration of an information processing apparatus in accordance with the present disclosure.
FIG. 2 is a flowchart illustrating a flow of a control method in accordance with the present disclosure.

The following description will discuss example embodiments of the present invention. However, the present invention is not limited to the example embodiments described below, but can be altered by a skilled person in the art within the scope of the claims. For example, any embodiment derived by appropriately combining technical means adopted in differing example embodiments described below can be within the scope of the present invention. Further, any embodiment derived by appropriately omitting one or more of the technical means adopted in differing example embodiments described below can be within the scope of the present invention. Furthermore, the advantage mentioned in each of the example embodiments described below is an example advantage expected in that example embodiment, and does not define the extension of the present invention. That is, any embodiment which does not provide the example advantages mentioned in the example embodiments described below can also be within the scope of the present invention.

First Example Embodiment

The following description will discuss a first example embodiment, which is an example embodiment of the present invention, in detail with reference to the drawings. The present example embodiment is basic to each of the example embodiments which will be described later. It should be noted that the applicability of each of the technical means adopted in the present example embodiment is not limited to the present example embodiment. That is, each technical means adopted in the present example embodiment can be adopted in another example embodiment included in the present disclosure, to the extent of constituting no specific technical obstacle. Further, each technical means illustrated in the drawings referred to for the description of the present example embodiment can be adopted in another example embodiment included in the present disclosure, to the extent of constituting no specific technical obstacle.

Configuration of Information Processing Apparatus 1

A configuration of an information processing apparatus 1 will be described below with reference to FIG. 1. FIG. 1 is a block diagram illustrating the configuration of the information processing apparatus 1. The information processing apparatus 1 includes an accepting section 101, a determining section 102, and a presenting section 103, as illustrated in FIG. 1.

The accepting section 101 accepts an input of a query. Note here that the term "query" means an order or an instruction for generating content. The "query" in the following description can therefore be replaced with a "generation order", a "generation instruction", or a "prompt". A form of the query is not particularly limited. For example, the accepting section 101 may accept the input of the query in a text form, or may accept the input of the query in another form such as an audio form.

The determining section 102 determines a generative model that is among a first generative model included in the information processing apparatus 1 and a second generative model included in another apparatus and that is to be caused to generate content in accordance with the query the input of which has been accepted by the accepting section 101. That is, the information processing apparatus 1 includes the first generative model, though not illustrated in FIG. 1. Further, the information processing apparatus 1 is configured to be capable of communicating with the another apparatus including the second generative model.

The determining section 102 may determine that one of the first and second generative models is a generative model which is to be caused to generate content, or may determine that both the first and second generative models are generative models each of which is to be caused to generate content. Further, a criterion by which the determining section 102 determines a generative model that is to be caused to generate content may be set in advance.

The first generative model and the second generative model are each a generative model that has been trained by machine learning so as to generate content in accordance with an inputted query. As each of the first and second generative models, a model in accordance with content intended to be generated may be used.

For example, in a case where a query described in a natural language is inputted so that a sentence consisting of words in the natural language is generated as content, a language model may be used as each of the first and second generative models. The language model is a model that has learned, by machine learning, an arrangement of components (such as words) of a sentence and an arrangement of sentences in text. Further, the first generative model and the second generative model may generate different types of content. For example, a language model that generates a sentence consisting of words in the natural language may be used as the first generative model, whereas an image generative model that generates an image may be used as the second generative model.

The presenting section 103 presents, to a user of the information processing apparatus 1, the content generated according to determination by the determining section 102. Specifically, the presenting section 103 presents, to the user, (i) the content generated by the first generative model, (ii) the content generated by the second generative model, or (iii) both (i) and (ii).

A manner in which the content is presented is not particularly limited. For example, the presenting section 103 may present the generated content by display output through a display apparatus, may present the generated content by audio output through an audio output apparatus, or may present the generated content by print output through a printing apparatus. The apparatus through which the content is presented may be included in the information processing apparatus 1, or may be included in an apparatus external to the information processing apparatus 1.

As above, the information processing apparatus 1 includes: the accepting section 101 which accepts an input of a query; the determining section 102 which determines a generative model that is among a first generative model included in the information processing apparatus 1 and a second generative model included in another apparatus and that is to be caused to generate content in accordance with the query the input of which has been accepted; and the presenting section 103 which presents, to a user, the content generated according to determination by the determining section 102.

With the above configuration, in a case where the determining section 102 determines that the second generative model is to be caused to generate content, the content is generated by another apparatus including the second generative model, and the generated content is presented to a user by the presenting section 103. In this case, it is possible to achieve presentation of content with an advantage of causing another apparatus to generate content utilized. Examples of the advantage in this case include an advantage of making it possible to present highly accurate content by causing another apparatus capable of generating highly accurate content with use of abundant computer resources to generate content.

Further, with the above configuration, in a case where the determining section 102 determines that the first generative model is to be caused to generate content, the content is generated by the first generative model included in the information processing apparatus 1, and the generated content is presented to a user by the presenting section 103. In this case, it is possible to achieve presentation of content with an advantage of generating content in the information processing apparatus 1 utilized. Examples of the advantage in this case include an advantage of making it possible to present content even in a situation where the information processing apparatus 1 cannot communicate with another apparatus, and an advantage of making it possible to present content in a shorter time than in a case where content is generated by another apparatus.

The information processing apparatus 1 thus provides an advantage of making it possible to optimize use of two types of generative models, i.e., the first generative model included in the information processing apparatus 1 and the second generative model included in another apparatus. Note that the phrase "optimize use of two types of generative models" does not necessarily mean that the two types of generative models are used in an optimum manner. For example, use of two types of generative models in a manner that is considered preferable in view of various conditions such as details of an inputted query and a status of communication with another apparatus can be said to "optimize use of two types of generative models" even if the manner has some disadvantage.

Control Program

Functions of the information processing apparatus 1 above can be realized by a program. A control program in accordance with the present example embodiment causes a computer to function as: an accepting means for accepting an input of a query; a determining means for determining a generative model that is among a first generative model and a second generative model and that is to be caused to generate content in accordance with the query; and a presenting means for presenting, to a user, the content generated according to determination by the determining means. Thus, the control program in accordance with the present example embodiment provides an advantage of making it possible to optimize use of two types of generative models, i.e., the first generative model and the second generative model.

Flow of Control Method

A flow of a control method will be described below with reference to FIG. 2. FIG. 2 is a flowchart illustrating the flow of the control method. It should be noted that each of steps of this control method may be carried out by a processor included in the information processing apparatus 1, or may be carried out by a processor included in any other apparatus. Alternatively, the steps may be carried out by respective processors provided in different apparatuses.

In S1 (accepting process), at least one processor accepts an input of a query.

In S2 (determining process), the at least one processor determines a generative model that is among a first generative model and a second generative model and that is to be caused to generate content in accordance with the query the input of which has been accepted in S1.

In S3 (presenting process), the at least one processor presents, to a user, the content generated according to determination in S2.

As above, in a control method in accordance with the present example embodiment, at least one processor carries out an accepting process of accepting an input of a query; a determining process of determining a generative model that is among a first generative model and a second generative model and that is to be caused to generate content in accordance with the query; and a presenting process of presenting, to a user, the content generated according to determination in the determining process. This provides an advantage of making it possible to optimize use of two types of generative models, i.e., the first generative model and the second generative model.

(Configuration of Content Generation System)

Figures 3, 4:
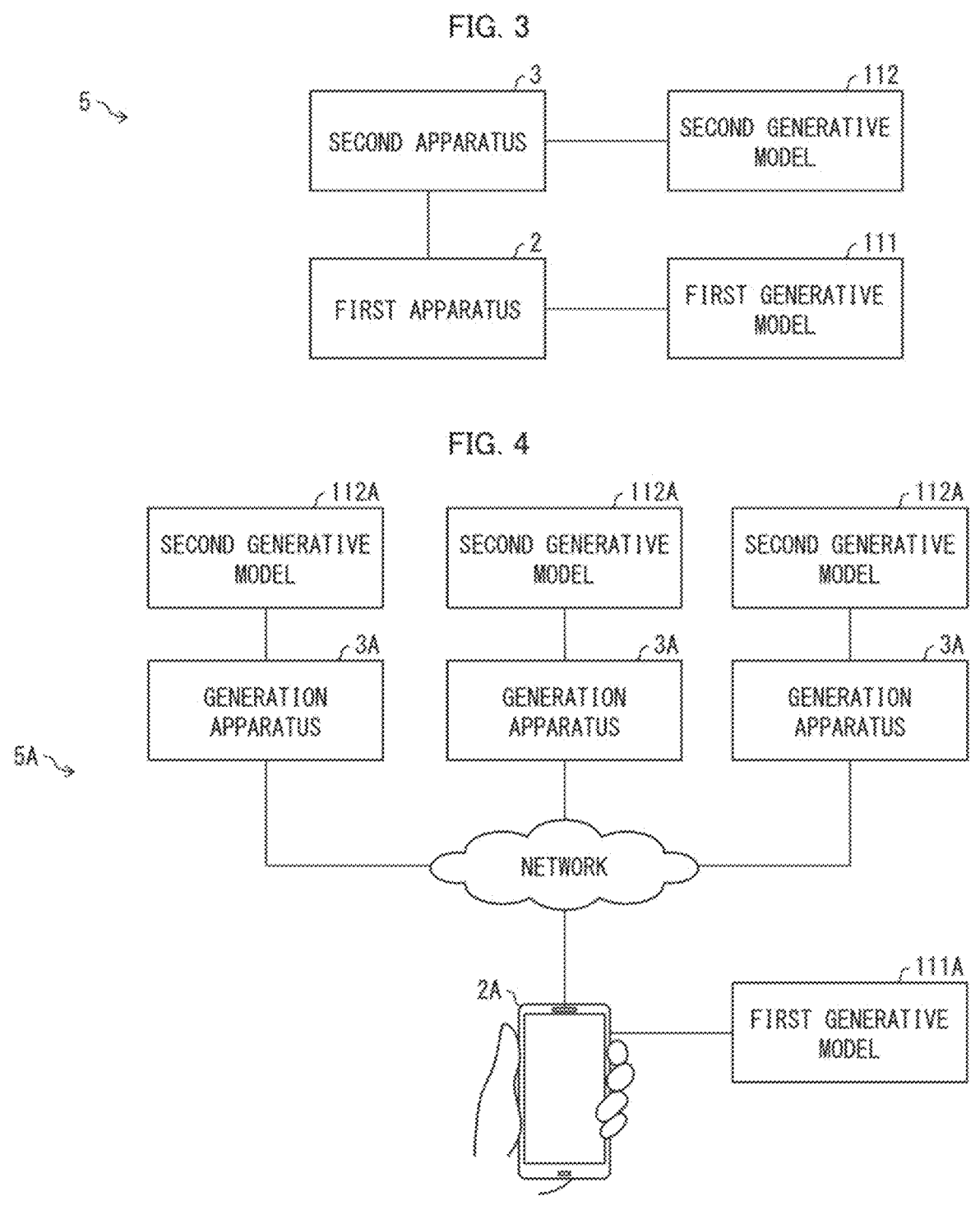

A configuration of a content generation system 5 will be described below with reference to FIG. 3. FIG. 3 is a block diagram illustrating the configuration of the content generation system 5. As illustrated, the content generation system 5 includes: a first apparatus 2 including the first generative model 111; and a second apparatus 3 including the second generative model 112.

The first apparatus 2 determines a generative model that is among the first generative model 111 and the second generative model 112 and that is to be caused to generate content in accordance with a query inputted to the content generation system 5, and presents, to a user, the content generated according to determination by the first apparatus 2. Note that the first generative model 111 included in the first apparatus 2 means that the first generative model 111 is stored in storage accessible to the first apparatus 2. The above storage may be included in the first apparatus 2, or may be storage external to the first apparatus 2.

More specifically, the first apparatus 2 which has determined that the first generative model 111 is to be caused to generate the content inputs the inputted query to the first generative model 111 so as to cause the first generative model 111 to generate the content, and presents the generated content to the user. In contrast, the first apparatus 2 which has determined that the second generative model 112 is to be caused to generate the content transmits the inputted query to the second apparatus 3. The first apparatus 2 then acquires, from the second apparatus 3, the content generated by the second generative model 112, and presents the acquired content to the user.

The second apparatus 3 uses the second generative model 112 included in the second apparatus 3 to generate the content. Note that the second generative model 112 included in the second apparatus 3 means that the second generative model 112 is stored in storage accessible to the second apparatus 3. The above storage may be included in the second apparatus 3, or may be storage external to the second apparatus 3.

More specifically, the second apparatus 3 that has received a query from the first apparatus 2 inputs the query to the second generative model 112 so as to cause the second generative model 112 to generate the content, and transmits the generated content to the first apparatus 2. The content transmitted by the second apparatus 3 is presented to the user by the first apparatus 2.

As above, the content generation system 5 in accordance with the present example embodiment includes: the first apparatus 2 including the first generative model 111; and the second apparatus 3 including the second generative model 112, the first apparatus 2 determining a generative model that is among the first generative model 111 and the second generative model 112 and that is to be caused to generate content in accordance with a query inputted to the content generation system 5, and presenting, to a user, the content generated according to determination by the first apparatus 2. Thus, the content generation system 5 provides an advantage of making it possible to optimize use of two types of generative models, i.e., the first generative model 111 and the second generative model 112.

Second Example Embodiment

The following description will discuss a second example embodiment, which is an example embodiment of the present invention, in detail with reference to the drawings. A component having the same function as a component described in the above example embodiment is assigned the same reference sign, and the description thereof is omitted where appropriate. It should be noted that the applicability of each of the technical means adopted in the present example embodiment is not limited to the present example embodiment. That is, each technical means adopted in the present example embodiment can be adopted in another example embodiment included in the present disclosure, to the extent of constituting no specific technical obstacle. Further, each technical means illustrated in the drawings referred to for the description of the present example embodiment can be adopted in another example embodiment included in the present disclosure, to the extent of constituting no specific technical obstacle.

(Configuration of Content Generation System 5A)

A configuration of a content generation system 5A will be described below with reference to FIG. 4. FIG. 4 is a representation of an outline of the content generation system 5A. The content generation system 5A includes the function of presenting, to a user of the content generation system 5A, content generated by a generative model.

As illustrated, the content generation system 5A includes a terminal 2A, a first generative model 111A, generation apparatuses 3A, and second generative models 112A. In the content generation system 5A, the terminal 2A is capable of communicating with the generation apparatuses 3A over any network.

Although three pairs each being a pair of a generation apparatus 3A and a second generative model 112A are illustrated in FIG. 4, the content generation system 5A only needs to include at least a pair of the generation apparatus 3A and the second generative model 112A. Further, the content generation system 5A may include more than one terminal 2A. Illustrated in FIG. 4 is an example in which the terminal 2A is a smartphone. However, the terminal 2A only needs to be an apparatus capable of implementing the functions of the respective blocks illustrated in FIG. 5 (described later), and is not limited to a smartphone.

The terminal 2A includes the first generative model 111A. The generation apparatus 3A includes the second generative model 112A. The terminal 2A that has accepted an input of a query determines a generative model that is among the first generative model 111A and the second generative model 112A and that is to be caused to generate content in accordance with the inputted query.

Note here that the terminal 2A which has determined that the first generative model 111 is to be caused to generate the content inputs the inputted query to the first generative model 111A so as to cause the first generative model 111A to generate the content, and presents the generated content to the user.

Examples of an advantage of causing the first generative model 111A to generate the content include an advantage such that a case of using the first generative model 111A makes it possible to generate the content without communicating with an external apparatus. The case of using the first generative model 111A is also advantageous in that a relatively short time is required from generation to presentation of the content. In addition, for example, since the first generative model 111A is included in the terminal 2A, ease of generation of the content in which user-related information of the terminal 2A is reflected can also be said to be advantageous.

In contrast, the terminal 2A which has determined that the second generative model 112A is to be caused to generate the content transmits the inputted query to the generation apparatus 3A. It is determined by the terminal 2A to which of the generation apparatuses 3A the query is to be transmitted. This point will be described later in detail. The generation apparatus 3A that has received the query inputs the received query to the second generative model 112A so as to cause the second generative model 112A to generate the content, and transmits the generated content to the terminal 2A. The terminal 2A then presents the received content to the user.

Example of an advantage of causing the second generative model 112A to generate the content include the following advantages: an advantage of making it possible to generate the content having a higher quality as compared with the first generative model 111A; an advantage of making it possible to generate the content with use of information acquired from a data source that is inaccessible to the terminal 2A; and an advantage of making it possible to generate the content in a data form in which the first generative model 111A cannot generate content.

Note here that a language model which has more explanatory variables is typically capable of generating an answer (content) having a higher quality, but requires higher computing power to generate the answer. Thus, in a case where the first generative model 111A and the second generative model 112A are language models, the first generative model 111A preferably has fewer explanatory variables than the second generative model 112A. With this, even in a case where the terminal 2A is inferior in computing power to the generation apparatuses 3A, the terminal 2A can use the first generative model 111A to quickly generate the content. Further, the terminal 2A can cause the generation apparatus 3A that is excellent in computing power to use the second generative model 112A to generate the content having a high quality.

(Configuration of Terminal 2A)

Figure 5:
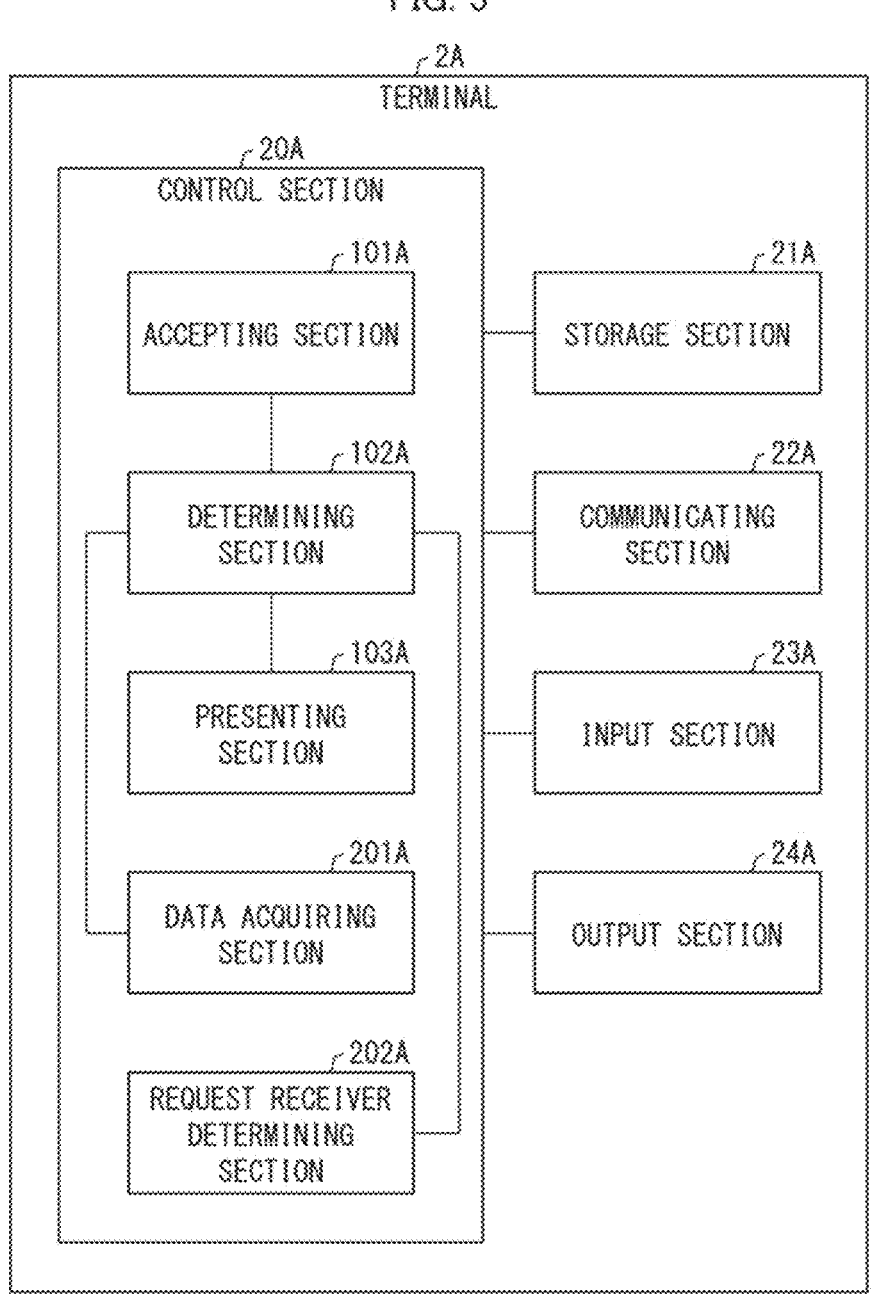
FIG. 5 is a block diagram illustrating a configuration of a terminal in accordance with the present disclosure.

A configuration of the terminal 2A will be described below with reference to FIG. 5. FIG. 5 is a block diagram illustrating the configuration of the terminal 2A. As illustrated, the terminal 2A includes: a control section 20A for performing overall control of the sections of the terminal 2A; and a storage section 21A in which various kinds of data used by the terminal 2A are stored. The storage section 21A may have the first generative model 111A stored therein. In addition, the terminal 2A includes: a communicating section 22A via which the terminal 2A communicates with another apparatus; an input section 23A for accepting the input, to the terminal 2A, of various kinds of data; and an output section 24A via which the terminal 2A outputs various kinds of data. The functions of the output section 24A and the input section 23A may be implemented via a touch screen. The output section 24A may output voice. Further, as illustrated, the control section 20A includes an accepting section 101A, a determining section 102A, a presenting section 103A, a data acquiring section 201A, and a request receiver determining section 202A. The functions of the respective sections included in the control section 20A can also be implemented by, for example, installing predetermined application software (control program) on the terminal 2A.

The accepting section 101A accepts an input of a query, like the accepting section 101 of the information processing apparatus 1. Note that the accepting section 101A may carry out a process of converting a data form of the inputted query into a predetermined data form. For example, in a case where the data form of a query that can be inputted to the first generative model 111A is a text form, if the query is inputted by voice, the accepting section 101A may convert, to the text form, the query, which is voice data. Note that a processing block different from the accepting section 101A may be provided so as to cause the processing block to convert the data form.

Like the determining section 102 of the information processing apparatus 1, the determining section 102A determines a generative model that is among the first generative model 111A included in the terminal 2A and the second generative model 112A included in the generation apparatus 3A and that is to be caused to generate content in accordance with the query the input of which has been accepted by the accepting section 101A. Various methods can be applied to a method for determining the generative model. Specific examples of the method for determining the generative model will be described later on the basis of FIGS. 7 to 9.

Further, the determining section 102A which has determined that the first generative model 111 is to be caused to generate the content inputs the inputted query to the first generative model 111A so as to cause the first generative model 111A to generate the content. In contrast, the determining section 102A which has determined that the second generative model 112A is to be caused to generate the content transmits the inputted query to the generation apparatus 3A so as to cause the generation apparatus 3A to generate the content with use of the inputted query and the second generative model 112A. The determining section 102A then acquires the generated content from the generation apparatus 3A.

Like the presenting section 103 of the information processing apparatus 1, the presenting section 103A presents, to a user, the content generated according to determination by the determining section 102A. For example, in a case where the content thus generated is text data, the presenting section 103A may present the content to the user by causing the output section 24A to output the content by display or voice. Further, the presenting section 103A may present the content to the user by transmitting the content to a printing apparatus via the communicating section 22A so as to output the content by printing.

The data acquiring section 201A acquires various kinds of data used to cause the first generative model 111A or the second generative model 112A to generate the content. For example, the data acquiring section 201A may acquire user-related information related to a user to whom the content is to be presented. In this case, by inputting, to the first generative model 111A, the user-related information in addition to the query, the determining section 102A can generate the content adapted for the user. The phrase "being adapted for the user" here means that at least part of the user-related information is reflected. Further, the user-related information may be related to (i) the user themselves, may be related to (ii) the query inputted by the user, or may be related to both (i) and (ii).

The request receiver determining section 202A determines which of the plurality of generation apparatuses 3A is to be caused to generate the content, i.e., a request receiver for content generation. A method for determining the request receiver may be determined as appropriate. As an example, the request receiver determining section 202A may determine the request receiver according to the query inputted by the user. As an example, in a case where the query contains a medical-related keyword, the request receiver determining section 202A may determine that the generation apparatus 3A which generates medical-related content with high accuracy is to be the request receiver. As another example, in a case where the query contains a mathematics-related keyword, the request receiver determining section 202A may determine that the generation apparatus 3A which is capable of generating content which contains a mathematical expression is to be the request receiver. As still another example, the request receiver determining section 202A may determine, according to language in which the query is described, the generation apparatus 3A that is to serve as the request receiver. Furthermore, the request receiver may be selected by a user. In this case, the request receiver determining section 202A determines the request receiver according to an operation by the user.

(Configuration of Generation Apparatuses 3A)

Figure 6:
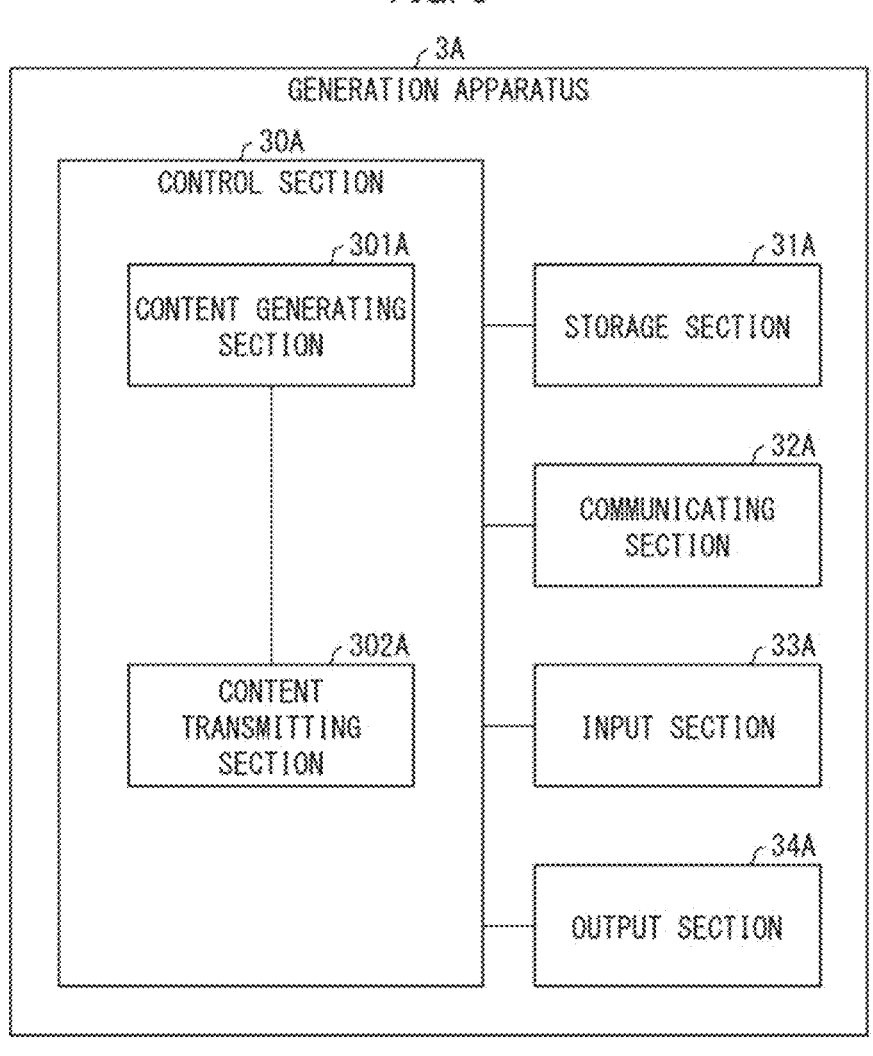
FIG. 6 is a block diagram illustrating a configuration of a generation apparatus in accordance with the present disclosure.

A configuration of the generation apparatuses 3A will be described below with reference to FIG. 6. FIG. 6 is a block diagram illustrating the configuration of the generation apparatuses 3A. As illustrated, the generation apparatuses 3A each include: a control section 30A for performing overall control of the sections of the generation apparatus 3A; and a storage section 31A in which various kinds of data used by the generation apparatus 3A are stored. In addition, the generation apparatuses 3A each include: a communicating section 32A via which the generation apparatus 3A communicates with another apparatus; an input section 33A for accepting an input of various kinds of data to the generation apparatus 3A; and an output section 34A via which the generation apparatus 3A outputs various kinds of data. Further, as illustrated, the control section 30A includes a content generating section 301A and a content transmitting section 302A.

The content generating section 301A causes the second generative model 112A to generate content. More specifically, the content generating section 301A inputs, to the second generative model 112A, a query received from the terminal 2A, so as to cause the second generative model 112A to generate content.

The content transmitting section 302A transmits, to the terminal 2A via the communicating section 32A, the content generated by the content generating section 301A.

Figure 7:
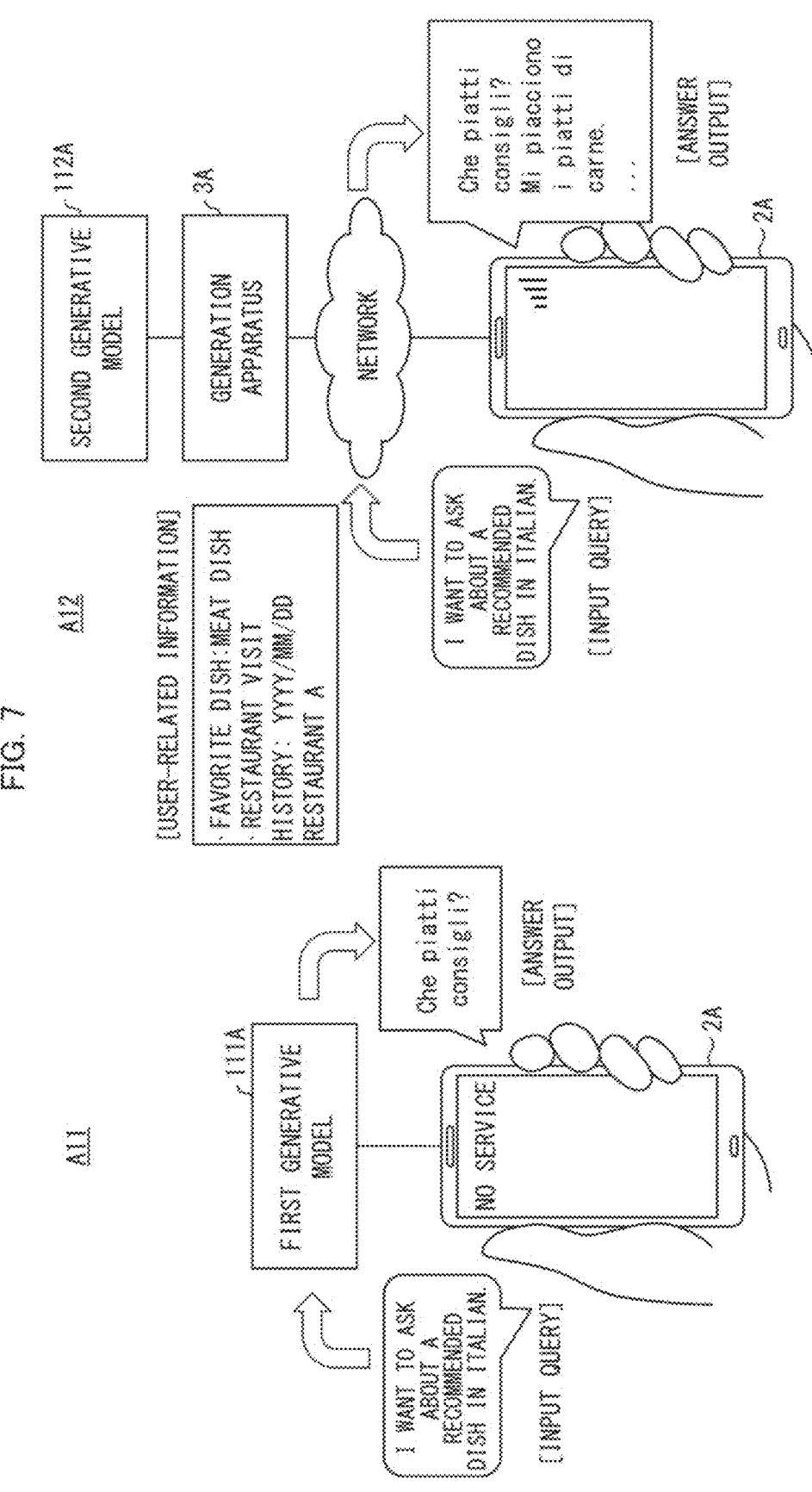
FIG. 7 is a representation of example content generation in the content generation system illustrated in FIG. 4.

Example Content Generation 1: Generative Model to Be Used Is Determined According to Status of Communication Example content generation in the content generation system 5A will be described below on the basis of FIG. 7. FIG. 7 is a representation of the example content generation in the content generation system 5A. FIG. 7 illustrates example content generation A11 in which the terminal 2A and the generation apparatus 3A cannot communicate with each other, and example content generation A12 in which the terminal 2A and the generation apparatus 3A can communicate with each other. In both the example generation A11 and the example generation A12, a query saying "I want to ask about a recommended dish in Italian" is inputted by voice to the terminal 2A. However, the example generation A11 and the example generation A12 differ in answer, i.e., content outputted with respect to the query.

Specifically, in the example generation A11, the terminal 2A is in a state in which radio waves from a base station of a mobile communications service cannot be received, i.e., a state of being outside of communication range. This prevents the terminal 2A from communicating with the generation apparatus 3A, and prevents the generation apparatus 3A from generating the content. Thus, in the example generation A11, the determining section 102A of the terminal 2A causes the first generative model 111A to generate the content. The presenting section 103A then outputs the generated content (specifically, an answer to the inputted query) by voice so as to present the content to a user.

Thus, even the terminal 2A that is in a state of being incapable of communicating with the generation apparatus 3A can generate the content with respect to the inputted query and present the content to a user. Note that a time at which the determining section 102A determines that the first generative model 111A is to be caused to generate the content is not necessarily a time at which communication with the generation apparatus 3A is impossible. In a case where a status of communication causes or is possibly expected to cause a problem to a series of processes in which the generation apparatus 3A is caused to generate content, and the generated content is presented to a user by the terminal 2A, the determining section 102A may determine that the first generative model 111A is to be caused to generate the content. For example, in a case where communication with the generation apparatus 3A is unstable or in a case where an average speed of communication with the generation apparatus 3A is not more than a predetermined threshold, the determining section 102A may determine that the first generative model 111A is to be caused to generate the content.

In contrast, in the example generation A12, the terminal 2A is in a state of being capable of communicating with the generation apparatus 3A. Thus, in the example generation A12, the determining section 102A of the terminal 2A transmits the inputted query to the generation apparatus 3A via a network so as to cause the second generative model 112A to generate the content.

Further, in so doing, to the generation apparatus 3A, the determining section 102A transmits, as user-related information related to a user of the terminal 2A, a dish that the user likes and a history of a visit to a restaurant by the user. In this manner, the user-related information may contain information indicating an attribute of a user, or may contain information indicating an activity history of a user. By transmitting the user-related information to the generation apparatus 3A, the content generating section 301A of the generation apparatus 3A can use the received user-related information to cause the second generative model 112A to generate content adapted for a user.

For example, the content generating section 301A may input the user-related information to the "xxxx" part of a template saying "Please generate an answer to a query of zzzz for a user of xxxx.", generate a query by inputting a received query to the "zzzz" part, and input the generated query to the second generative model 112A so as to cause the second generative model 112A to generate the content.

Further, the content generating section 301A may use the second generative model 112A by inputting the query and the user-related information thereto, the second generative model 112A having been trained in advance so as to generate the content adapted for the user indicated by the user-related information. In this case, the content generating section 301A does not need to use, for example, a template to generate a query, but only needs to input, to the second generative model 112A, the query and the user-related information as they are.

In the example generation A12, the presenting section 103A outputs the generated content (specifically, an answer to the inputted query) by voice so as to present the content to a user. The answer presented in the example generation A12 is identical in opening part to the answer in the example generation A11, but differs from the answer in the example generation A11 in that text generated on the basis of the user-related information is contained in the answer presented in the example generation A12.

Further, the content generating section 301A may generate the content by inputting, to the second generative model 112A, information other than the user-related information. For example, to the second generative model 112A, the content generating section 301A may input, together with the query, information detected by using the user-related information to carry out search. For example, in a case where the user-related information contains position information indicating a location of a user, and a predetermined word such as "restaurant", the content generating section 301A may use the word and the position information to search for a web site. Then, to the second generative model 112A, the content generating section 301A may input, together with the query received from the terminal 2A, text extracted from a detected web site, so as to cause the second generative model 112A to generate the content. This even allows text regarding a restaurant accessible from the location of the user to be generated as content to be presented to the user.

Note that the user-related information may be inputted to the terminal 2A by a user in advance. Alternatively, the data acquiring section 201A may generate the user-related information from an e-mail stored in the storage section 21A, a schedule stored in the storage section 21A, and a history of a post on a social networking service (SNS) which history is stored in the storage section 21A, information on a position of the terminal 2A, and any other information. Automatically generating the user-related information can save a user from having to perform input. Further, in a case where a past event that the user has forgotten and/or a matter that the user has not noticed is/are reflected in the user-related information, it is possible to generate the content that has significance for the user.

Further, the determining section 102A may use the user-related information to cause the first generative model 111A to generate the content. In this case, the determining section 102A may, for example, use the above-described template to generate a query in which the user-related information is reflected, and input the query to the first generative model 111A so as to cause the first generative model 111A to generate the content. The determining section 102A may generate the content with use of the first generative model 111A that has been trained in advance so as to be capable of generating the content adapted for a user. For example, in a case where a language model is used as the first generative model 111A, the language model may be retrained with use of labeled training data in which various queries and pieces of content judged by a user to be suitable for the various queries are associated with each other. By using such a language model as the first generative model 111A, it is possible for the determining section 102A to generate content adapted for a user.

As above, the determining section 102A may determine, according to a status of communication with the generation apparatus 3A, a generative model that is to be caused to generate content. This provides, in addition to the example advantage provided by the information processing apparatus 1, the following example advantages: even in a case where there is a problem with the status of communication, it is possible to present the content; and in a case where there is no problem with the status of communication, it is possible to present the content generated by the generation apparatus 3A.

Note here that the status of communication can be improved after the first generative model 111A is caused to generate the content. In such a case, the determining section 102A may determine that the second generative model 112A is also to be caused to generate the content. This provides, in addition to the example advantage provided by the information processing apparatus 1, an example advantage of making it possible to present, in a case where the status of communication has been improved, the content generated by the generation apparatus 3A.

Further, as described earlier, the information processing apparatus 1A includes the data acquiring section 201A that acquires user-related information related to a user. In a case where it is determined that the second generative model 112A is to be caused to generate the content, the determining section 102A transmits the user-related information and the query to the generation apparatus 3A so as to cause the generation apparatus 3A to generate the content in accordance with the user-related information. This provides, in addition to the example advantage provided by the information processing apparatus 1, an example advantage of making it possible to cause the generation apparatus 3A to generate content adapted for a user, and present the content.

Example Content Generation 2: Generative Model to be Used is Determined According to Query The determining section 102A may determine, according to details of a query, a generative model that is to be caused to generate content. This configuration provides, in addition to the example advantage provided by the information processing apparatus 1, an example advantage of making it possible to generate appropriate content in accordance with details of a query. The following description will discuss, on the basis of FIG. 8, an example of determining, according to details of a query, a generative model that is to be caused to generate content.

Figure 8:
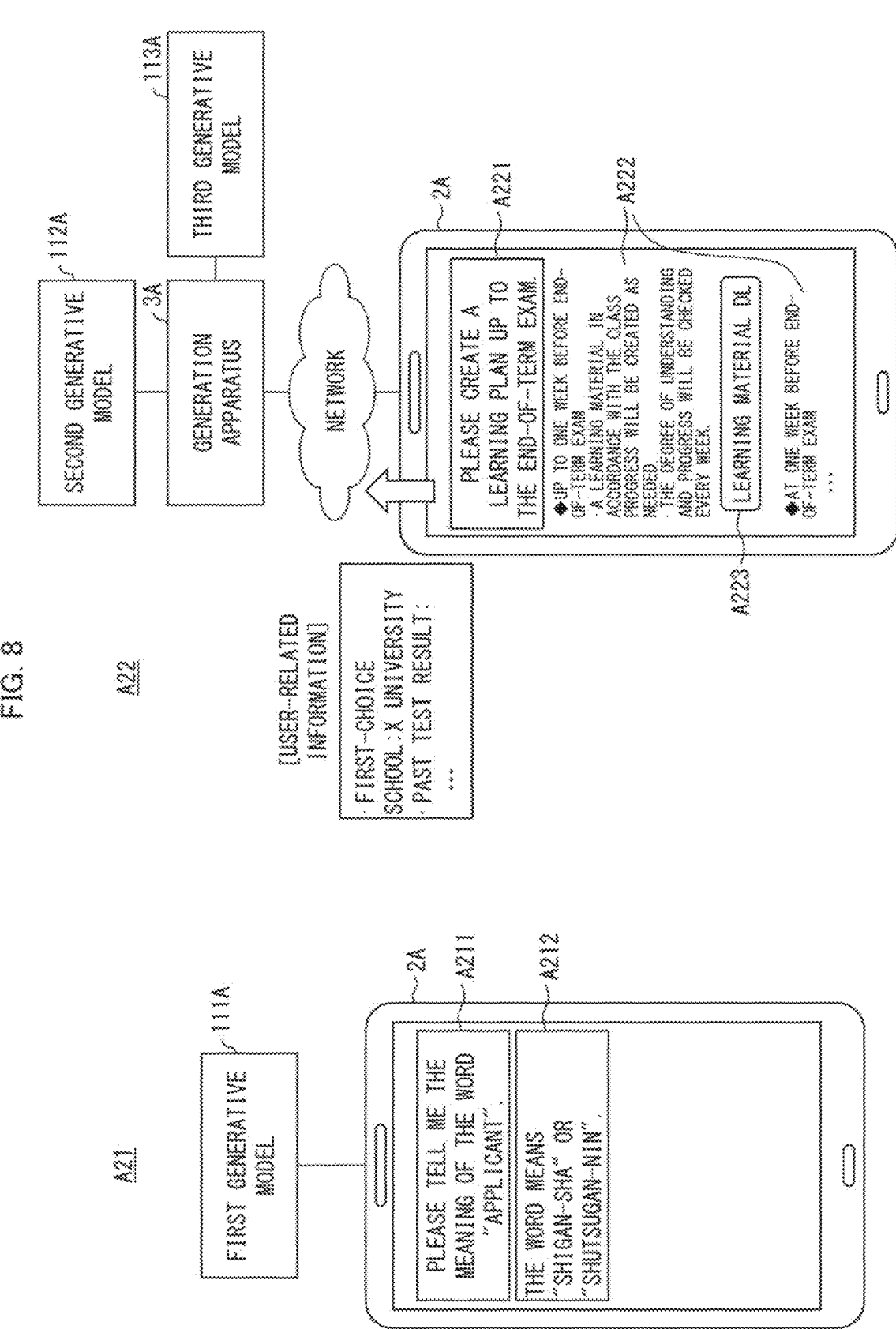
FIG. 8 is a representation of another example content generation in the content generation system illustrated in FIG. 4.

FIG. 8 is a representation of another example content generation in the content generation system 5A. FIG. 8 illustrates example content generation A21 with respect to a query saying "Please tell me the meaning of the word "applicant".", and example content generation A22 with respect to a query saying "Please create a learning plan up to the end-of-term exam.". In this manner, the content generation system 5A can also be used as an education support system.

In the example generation A21, a display section of the terminal 2A displays a query A211 saying "Please tell me the meaning of the word "applicant".". This query has been inputted by a user. In the example generation A21, the determining section 102A of the terminal 2A determines that the first generative model 111A is to be caused to generate content, and inputs the query A211 to the first generative model 111A so as to cause the first generative model 111A to generate the content. By causing the terminal 2A to display the generated content, i.e., text A212, which is an answer to the query A211, the presenting section 103A presents the answer to the user.

In contrast, in the example generation A22, a query A221 "Please create a learning plan up to the end-of-term exam." is inputted. The determining section 102A of the terminal 2A determines that the second generative model 112A is to be caused to generate content, transmits the query A221 and the user-related information to the generation apparatus 3A, and causes the second generative model 112A to generate the content. By causing the terminal 2A to display the generated content, i.e., text A222, which is an answer to the query A221, the presenting section 103A presents the answer to the user.

Further, in the example generation A22, a link A223 for downloading (DL) a learning material is displayed on the display section of the terminal 2A. The third generative model 113A is used to generate the learning material. In this manner, the generation apparatus 3A may use a plurality of generative models to generate the content. Note that the third generative model 113A may be included in the generation apparatus 3A, or may be included in any other apparatus. In this manner, the generation apparatus 3A may use another system (e.g., an AI system) in addition to the second generative model 112A to generate the content. This makes it possible to present more substantial content to a user.

As a method for achieving selective use of the first generative model 111A and the second generative model 112A as described above, it is possible to apply, for example, a method of determining, according to a keyword contained in a query, a generative model that is to be caused to generate content. For example, "learning plan", "learning program", and "schedule", or keywords similar in meaning to these may be set in advance. With this, upon input of a query containing any of the set keywords, such as A221, the determining section 102A can determine that the second generative model 112A is to be used. In contrast, upon input of a query containing none of the set keywords, such as A211, the determining section 102A can determine that the first generative model 111A is to be used.

The second generative model 112A that is used upon input of a query containing a keyword related to generation of a learning plan as described above is preferably a model suitable for generation of a learning plan. For example, it is possible to use the second generative model 112A that has been trained with use of labeled training data in which user information of various users pertaining to learning and a query requesting generation of a learning plan for the various users are associated with a learning plan suitable for the various users. This makes it possible to present a suitable learning plan.

In addition, for example, in a case where the query contains keywords such as "in detail", "video", and "image" or keywords similar in meaning to those keywords, the determining section 102A may determine that the second generative model 112A is to be caused to generate the content. This makes it possible to cause the second generative model 112A to generate content that is difficult to generate by the first generative model 111A (e.g., detailed answers to questions of expertise and advanced mathematical problems, a detailed description of complex concepts and theories such as physics and chemistry, content containing an image, etc.), and present the content to a user.

Further, in a case where a plurality of second generative models 112A are available, the determining section 102A may determine, according to a keyword contained in a query, which of the plurality of second generative models 112A is to be caused to generate the content. As an example, in a case of input of a query containing keywords such as "mathematical expression" and "equation", the determining section 102A may determine that the second generative model 112A which is capable of generation of a mathematical expression and description and calculation with use of a mathematical expression is to be caused to generate the content. As another example, in a case of input of a query containing keywords such as "chemical formula" and "chemical reaction", the determining section 102A may determine that the second generative model 112A which is capable of generation of a chemical formula and description and calculation with use of a chemical formula is to be caused to generate the content.

Further, in a case where a query contains a predetermined keyword, the determining section 102A may determine that the first generative model 111A is to be caused to generate the content. For example, in a case where the query contains keywords such as "quickly", and "easily" or keywords similar in meaning to those keywords, the determining section 102A may determine that the first generative model 111A is to be caused to generate the content.

Further, for example, a query that contains keywords of both "word" and "meaning" inquires about the meaning of a word, and a degree of difficulty in generating an answer is assumed to be relatively low. Thus, in a case where the query contains these keywords or keywords similar in meaning to those keywords, the determining section 102A may determine that the first generative model 111A is to be caused to generate the content.

Furthermore, in a case where the query contains (i) two keywords, i.e., "grammar" and "check" or keywords similar in meaning to those keywords and (ii) a sentence to be checked, the determining section 102A may determine that the first generative model 111A is to be caused to generate the content. This allows a process of checking for an error in the grammar to be smoothly carried out with use of the first generative model 111A.

Moreover, for example, in a case where the query contains two keywords, i.e., "progress" and "check" or keywords similar in meaning to those keywords, the determining section 102A may determine that the first generative model 111A is to be caused to generate the content. In a case where the first generative model 111A is used, the user-related information stored in the terminal 2A is easily used. This makes it possible to smoothly generate content that indicates progress of learning by a user determined from the user-related information. It is also possible to cause the first generative model 111A to generate, for example, advice in accordance with the progress, and a message encouraging a suitable review.

Another Example of Method for Determining Generative Model

The determining section 102A may determine, according to a user, a generative model that is to be caused to generate content. Note here that the user may be a user who has inputted a query, may be a user related to the inputted query, or may be a user to whom the content is to be presented. In a case where the generative model that is to be caused to generate the content is determined according to the user, user-related information related to the user may be acquired by the data acquiring section 201A. This allows the determining section 102A to use the acquired user-related information to determine the generative model that is to be caused to generate the content.

For example, the data acquiring section 201A may acquire user-related information indicating how learning by the user progresses. This allows the determining section 102A to determine that the generative model in accordance with how learning by the user progresses is caused to generate the content. For example, in a situation where learning by the user does not progress, it is possible to cause the first generative model 111A to generate a simple answer to a query regarding learning by the user. It is also possible to cause the second generative model 112A to generate an answer with high expertise in a situation where learning has progressed. Similarly, it is possible to use, as the user-related information, age of the user, academic background of the user, a qualification possessed by the user, academic achievement of the user, a degree of understanding by the user and a degree of learning by the user in various academic fields, etc., to determine, with use of these pieces of information, the generative model that is to be caused to generate the content.

The determining section 102A may determine, according to a query input method, the generative model that is to be caused to generate the content. For example, the determining section 102A may determine, for a query inputted by voice, that the first generative model 111A is to be caused to generate the content, and may determine, for a query inputted by text, that the second generative model 112A is to be caused to generate the content. This makes it possible to selectively use voice input and text input such that voice input is performed in a case where a response speed is desired to be emphasized, and text input is performed in a case where details of response are desired to be emphasized. (Job Support System)

As described earlier, the determining section 102A can determine, according to details of a query, which of the first generative model 111A and the second generative model 112A is to be caused to generate the content. This allows the content generation system 5 to be also used as a job support system for supporting a job of a user.

In this case, various kinds of information pertaining to the job of the user may be used as the user-related information. For example, by using a job manual as the user-related information, it is possible to cause the first generative model 111A or the second generative model 112A to generate an answer in accordance with the job manual.

Further, in this case, the determining section 102A may determine that the first generative model 111A is to be used for a query which can be handled by the first generative model 111A, and may determine that the second generative model 112A is to be used for a query that is difficult to handle by the first generative model 111A.

For example, it is also possible to support a job by inputting a question pertaining to the job as a query and presenting content indicating an answer to the question. In this case, the determining section 102A may determine that the second generative model 112A is to be used for a query containing a vocabulary which cannot be understood by the terminal 2A and a query regarding a unique case, and may determine that the first generative model 111A is to be used for the other queries. As an example, in a case where the inputted query contains a word that is not contained in the user-related information, the determining section 102A may determine that the second generative model 112A is to be used. As another example, in a case where the inputted query contains technical terminology, etc., the determining section 102A may determine that the second generative model 112A which is suitable for the technical field is to be used. The technical terminology, etc. for which the second generative model 112A is to be used may be registered in advance.

Further, it is assumed that there is user-related information which is not preferably transmitted to an external apparatus such as the generation apparatus 3A for reasons of, for example, security. In such a case, the determining section 102A may determine, in a case where the content is to be generated with use of the user-related information, that the first generative model 111A is to be used, and may determine, in a case where the content is to be generated without using the user-related information, that the second generative model 112A is to be used. This makes it possible to generate the content without transmitting the user-related information to outside the terminal 2A. Note that whether to use the user-related information may be determined from, for example, details of a query. Note also that the user-related information which is not preferably transmitted to an external apparatus such as the generation apparatus 3A may be used only to generate the content with use of the first generative model 111A.

Example Content Generation 3: Content Corresponding to Each Part of Query is Shared and Generated The determining section 102A may determine that the first generative model 111A is to be caused to generate the content corresponding to a part of the query, and may determine that the second generative model 112A is to be caused to generate the content corresponding to another part of the query. This configuration provides, in addition to the example advantage provided by the information processing apparatus 1, an example advantage of making it possible to generate, for each part of a query, appropriate content in accordance with details of the query. The following description will discuss, on the basis of FIG. 9, an example in which the first generative model 111A and the second generative model 112A are each caused to generate content corresponding to each part of a query.

Figure 9:
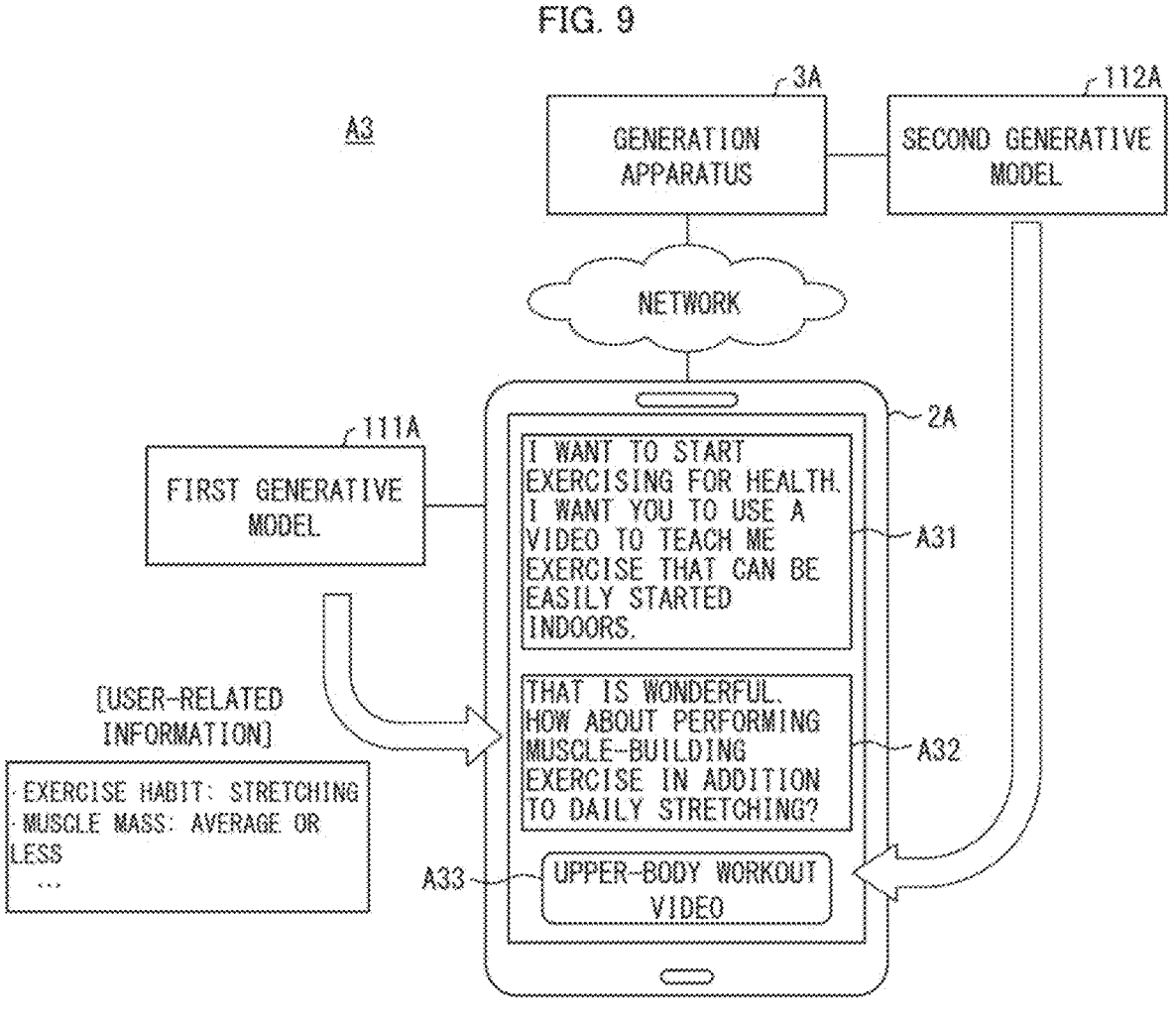
FIG. 9 is a representation of still another example content generation in the content generation system illustrated in FIG. 4.

FIG. 9 is a representation of still another example content generation in the content generation system 5A. In example content generation A3 illustrated in FIG. 9, content A32 and a link A33 are presented to a query A31 inputted to the terminal 2A by a user. Specifically, the query A31 says as follows: "I want to start exercising for health. I want you to use a video to teach me exercise that can be easily started indoors." In addition, the content A32 is text saying "That is wonderful. How about performing muscle-building exercise in addition to daily stretching?", and A33 is a link for accessing a video that describes an upper-body workout method. In this manner, the content generation system 5A can also be used for health care.

In the example generation A3, the determining section 102A inputs, to the first generative model 111A, the first half part of the query A31, i.e., "I want to start exercising for health." and user-related information indicating an exercise habit, a muscle mass, etc. of a user. With this, a message for a user in consideration of this user-related information is generated as the content A32 and presented.

Further, the determining section 102A transmits, to the generation apparatus 3A, the second half part of the query A31, i.e., "I want you to use a video to teach me exercise that can be easily started indoors.". With this, the generation apparatus 3A inputs this part to the second generative model 112A so as to generate a video, and transmits the generated video to the terminal 2A. With this, the link A33 to the video is presented in the terminal 2A. Note that the determining section 102A may also transmit, to the generation apparatus 3A, the user-related information in addition to the second half part of the query A31.

In a case where content corresponding to each part of a query is shared and generated, the determining section 102A divides an inputted query into a plurality of parts. Division may be carried out by any method. For example, the determining section 102A may divide the inputted query at a predetermined punctuation symbol (e.g. a comma, a period, an exclamation mark, a question mark, a space, etc.). The determining section 102A then determines, for each part obtained by the division, a generative model that is to be caused to generate content. The generative model may be determined on the basis of details of the each part. For example, the determining section 102A may cause the second generative model 112A to generate the content for a part that contains a predetermined keyword such as "video", and may cause the first generative model 111A to generate the content for a part that does not contain such a keyword.

(Delay Up to Time at which Content Generated by Second Generative Model is Presented)

In the content generation system 5A, the content generated by the generation apparatus 3A can be presented on the terminal 2A. This can cause a delay between input of a query by a user to the terminal 2A and presentation, to the user, of content generated by the generation apparatus 3A, due to factors such as communications environment, the data size of the generated content, and a method for generating the content. To address this, during a period up to a time at which the content generated by the generation apparatus 3A becomes available for presentation, the terminal 2A may present, to the user, the content generated by the first generative model 111A.

Figure 10:
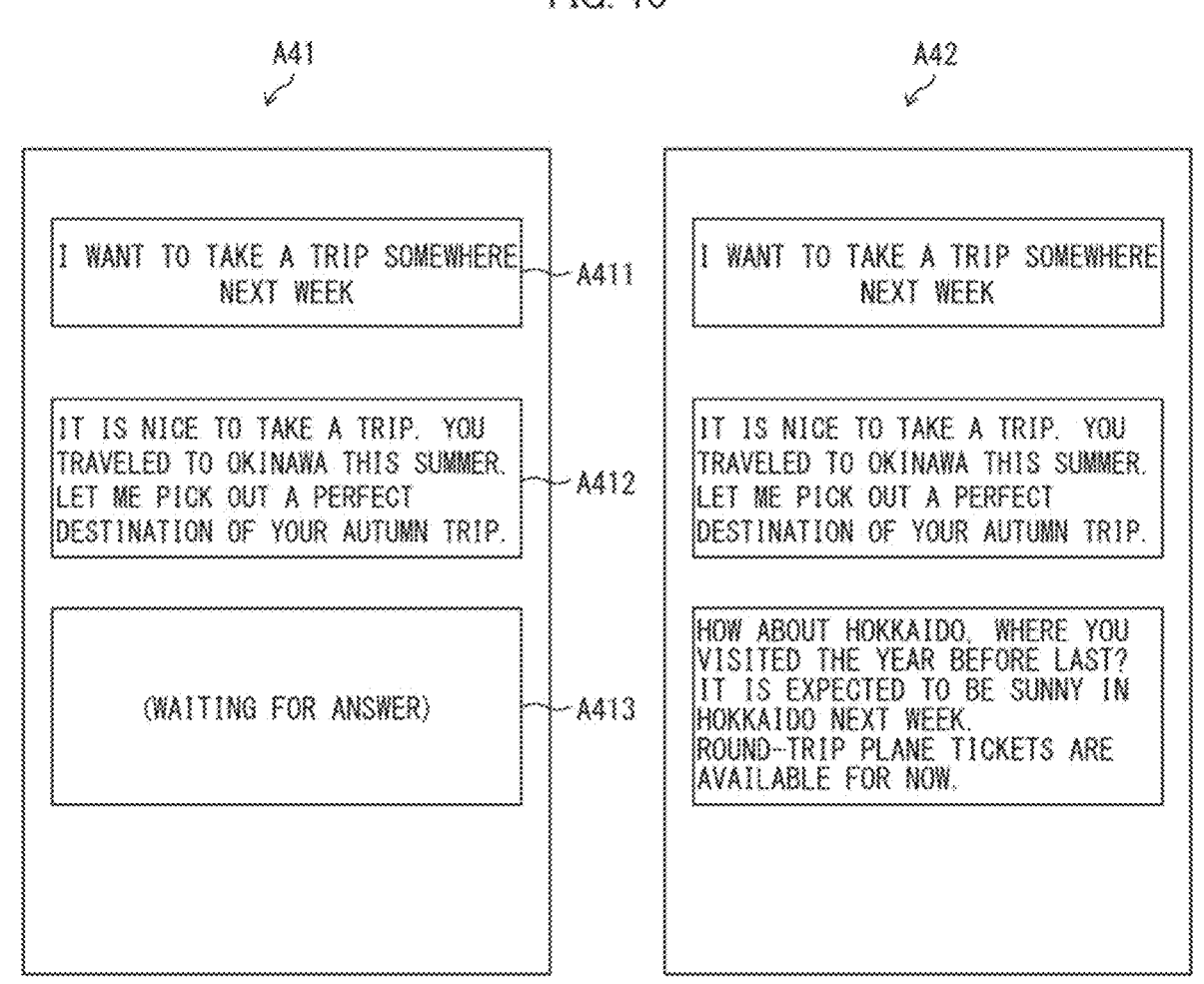
FIG. 10 is a representation of an example display screen displayed by the terminal illustrated in FIG. 5.

This will be described below on the basis of FIG. 10. FIG. 10 is a representation of an example display screen displayed by the terminal 2A. More specifically, FIG. 10 illustrates: a screen A41 displayed during a period from input of a query by a user to a time at which the content generated by the generation apparatus 3A becomes available for presentation; and a screen A42 on which the content generated by the generation apparatus 3A is presented.

In the screens A41 and A42, three display areas, i.e., A411 to A413 are defined. Among the areas, A411 is a display area in which to display a query inputted by a user. In the display area A411 illustrated in FIG. 10, a query saying "I want to take a trip somewhere next week" is displayed.

In the example of FIG. 10, the determining section 102A determines that the second generative model 112A is to be caused to generate the content. Thus, the determining section 102A transmits the above query (and user-related information) to the generation apparatus 3A so as to instruct generation of the content. Further, the determining section 102A inputs the above query (and user-related information) to the first generative model 111A so as to cause the first generative model 111A to generate the content.

The display area A412 is a display area in which to display the content generated by the first generative model 111A. Since the first generative model 111A is included in the terminal 2A, the content can be quickly displayed in the display area A412 as illustrated in the screen A41. To the first generative model 111A, the determining section 102A may input, as it is, the query inputted by the user. Alternatively, the determining section 102A may process the query (e.g., additionally write that the generation apparatus 3A is being requested to generate content) and then input the query to the first generative model 111A.

Meanwhile, the display area A413 is a display area in which to display the content generated by the second generative model 112A. In a stage where the screen A41 is displayed, since the content that the generation apparatus 3A is instructed to generate is not available for presentation, a character string indicating a wait for an answer is displayed in the display area A413. In a case where it is not necessary to let user know the wait for an answer, such a display may be omitted.

While the screen A41 is being displayed, the generation apparatus 3A causes the second generative model 112A to generate the content, and the determining section 102A acquires the generated content. The presenting section 103A then displays the acquired content in the display area A413. This results in switch from the screen A41 to the screen A42. In the display area A413 of the screen A42, the content generated by the second generative model 112A is displayed. The presenting section 103A may end, at the time of starting of presentation of the content generated by the second generative model 112A, presentation of the content generated by the first generative model 111A. In this case, it is not necessary to make the display areas A412 and A413 separated from each other.

As above, in a case where the determining section 102A determines that both the first generative model 111A and the second generative model 112A are to be caused to generate the content, the presenting section 103A may present, during a period up to a time at which the content generated by the second generative model 112A becomes available for presentation, the content generated by the first generative model 111A. This provides, in addition to the example advantage provided by the information processing apparatus 1, an example advantage of making it possible to make a user feel less stressed while waiting for presentation of the content generated by the second generative model 112A.

(Flow of Processes)

Figure 11:
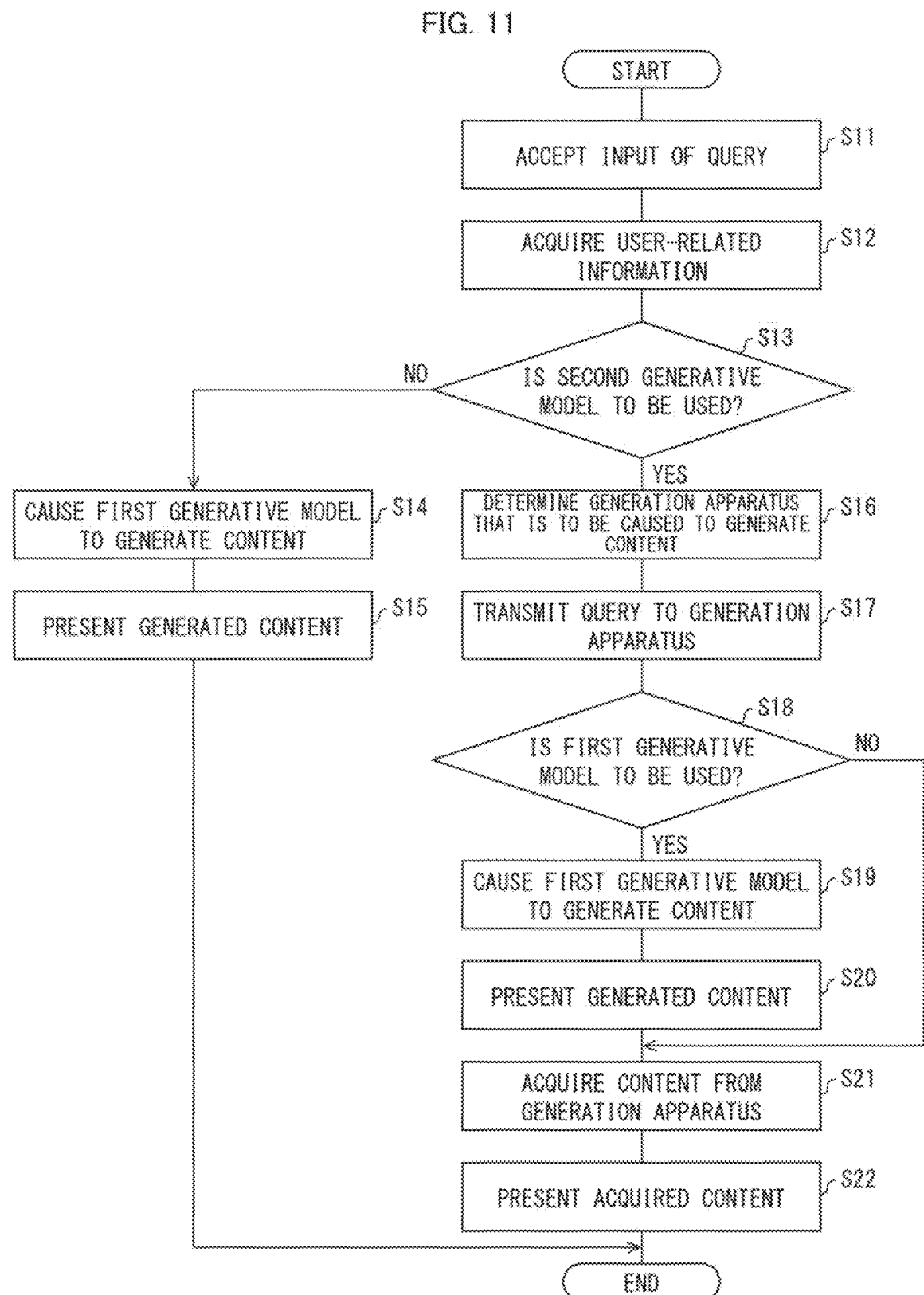
FIG. 11 is a flowchart illustrating a flow of processes carried out by the terminal illustrated in FIG. 5.

A flow of processes carried out by the terminal 2A will be described below on the basis of FIG. 11. FIG. 11 is a flowchart illustrating the flow of processes carried out by the terminal 2A. The flow of FIG. 11 includes the steps of the control method in accordance with the present example embodiment.

In S11 (accepting process), the accepting section 101A accepts an input of a query. For example, the accepting section 101A may accept, as the query, text inputted by a user of the terminal 2A via the input section 23A.

In S12, the data acquiring section 201A acquires user-related information. The user-related information may be inputted by the user, or may be stored in advance in the storage section 21A or the like. Further, the data acquiring section 201A may acquire, as the user-related information, information related to the inputted query, from among various kinds of information related to the user which are stored in advance in the storage section 21A or the like.

In S13 (determining process), the determining section 102A determines a generative model that is to be caused to generate content in accordance with the query accepted in S11. More specifically, in S13, the determining section 102A judges whether to use the second generative model 112A to generate the content. For example, according to, for example, a status of communication with the generation apparatus 3A, details of the query, or the user-related information acquired in S12, the determining section 102A may determine whether to use the second generative model 112A. In a case where it is judged in S13 that the second generative model 112A is to be caused to generate the content (YES in S13), the processing proceeds to S16, and in a case where it is judged in S13 that the first generative model 111A is to be caused to generate the content (NO in S13), the processing proceeds to S14.

In S14, the determining section 102A inputs, to the first generative model 111A, the query inputted in S11, so as to cause the first generative model 111A to generate the content. In so doing, to the first generative model 111A, the determining section 102A may input, together with the query inputted in S11, the user-related information acquired in S12. Subsequently, in S15 (presenting process), the presenting section 103A presents, to the user, the content generated in S14. The illustrated processes thus end.

In S16, the request receiver determining section 202A determines the generation apparatus 3A that is to be caused to generate the content. As described above, various methods are applicable to determination of the generation apparatus 3A that is to be caused to generate the content. In a case where a single generation apparatus 3A generates the content, the process of S16 is omitted.

In S17, the determining section 102A transmits the query inputted in S11 to the generation apparatus 3A determined in S16, and instructs generation of the content. In so doing, to the generation apparatus 3A, the determining section 102A may transmit, together with the query inputted in S11, the user-related information acquired in S12. In the generation apparatus 3A that has received the query (and the user-related information), the content generating section 301A inputs the query (and the user-related information) to the second generative model 112A so as to cause the second generative model 112A to generate the content. Upon completion of generation of the content, the content transmitting section 302A transmits the generated content to the terminal 2A.

In S18, the determining section 102A judges whether to use the first generative model 111A. A condition of judgment in S18 may be determined in advance. For example, in a case where the generation apparatus 3A determined in S16 is a predetermined generation apparatus 3A in which it takes a relatively long time to generate the content, the determining section 102A may judge that the first generative model 111A is to be used. In a case where the judgment in S18 is NO, the processing proceeds to S21, and in a case where the judgment in S18 is YES, the processing proceeds to S19.

In S19, as in S14, the determining section 102A inputs, to the first generative model 111A, the query inputted in S11, so as to cause the first generative model 111A to generate the content. Subsequently, in S20, the content generated in S19 is presented to the user. This allows the content generated by the first generative model 111A to be presented during a period up to a time at which the content generated by the second generative model 112A is presented. In a case where it is not necessary, during the period, to present the content generated by the first generative model 111A, the processes of S18 to S20 may be omitted.

In S21, the determining section 102A acquires, from the generation apparatus 3A that has generated the content according to the process of S17, the content (content generated by the second generative model 112A). Note that this content is transmitted by the content transmitting section 302A of the generation apparatus 3A as described above. In S22 (presenting process), the presenting section 103A presents, to the user, the content acquired in S21. The illustrated processes thus end.

In a case where in S13, it is determined on the basis of the status of communication with the generation apparatus 3A that the second generative model 112A is not to be used, i.e. that the first generative model 111A is to be used, the determining section 102A carries out the process of S13 again after the content generated by the first generative model 111A is presented. In a case where the status of communication with the generation apparatus 3A has been improved, the determining section 102A determines that the second generative model 112A is also to be caused to generate the content.

Further, as in the example of FIG. 9, in a case where different generative models are caused to generate content corresponding to each part of a single query, the determining section 102A may divide the inputted query into a plurality of parts and then carry out the process of S13 and the subsequent processes for each of the parts. In this case, the processes of S18 to S20 may be omitted.

Variation

The agent for each of the processes described in the above example embodiments is any performer, and is not limited to the above examples. That is, the functions of the information processing apparatus 1, the first apparatus 2, the second apparatus 3, the terminal 2A, and the generation apparatus 3A can be implemented by a plurality of apparatuses (which can also be referred to as processors) capable of communicating with each other. For example, the processes described in the flowcharts of FIGS. 2 and 11 can be shared and carried out by the plurality of processors. That is, the processes in the above example embodiments may be carried out by a single processor, or may be carried out by a plurality of processors.

Software Implementation Example

Some or all of the functions of each of the information processing apparatus 1, the first apparatus 2, the second apparatus 3, the terminal 2A, and the generation apparatus 3A (hereinafter, "each apparatus above") may be implemented by hardware such as an integrated circuit (IC chip), or may be implemented by software.

Figure 12:
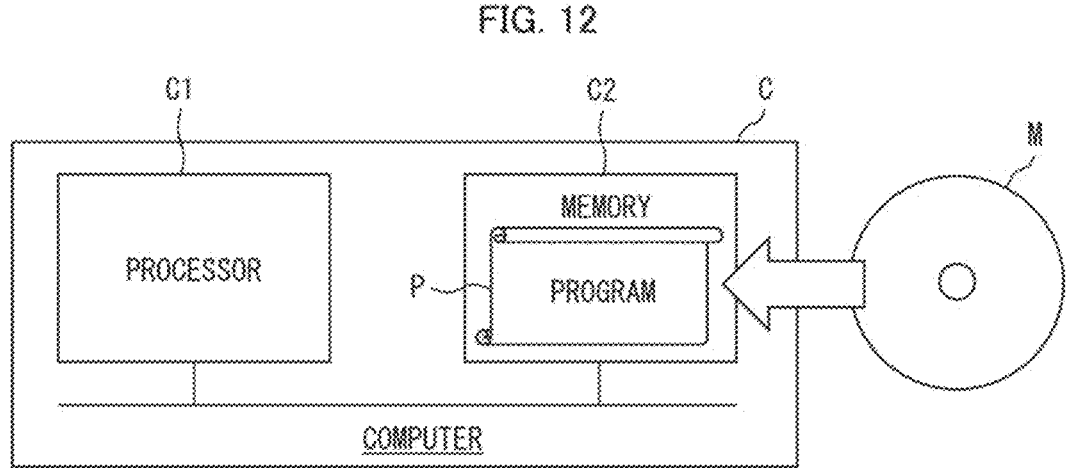
FIG. 12 is a block diagram illustrating a configuration of a computer which functions as, for example, the information processing apparatus in accordance with the present disclosure.

In the latter case, each apparatus above is provided by, for example, a computer that executes instructions of a program that is software implementing the foregoing functions. An example (hereinafter, computer C) of such a computer is illustrated in FIG. 12. FIG. 12 is a block diagram illustrating a hardware configuration of the computer C which functions as each apparatus above.

The computer C includes at least one processor C1 and at least one memory C2. The memory C2 has recorded thereon a program (control program) P for causing the computer C to operate as each apparatus above. The processor C1 of the computer C retrieves the program P from the memory C2 and executes the program P, so that the functions of each apparatus above are implemented.

Examples of the processor C1 can include a central processing unit (CPU), a graphic processing unit (GPU), a digital signal processor (DSP), a micro processing unit (MPU), a floating point number processing unit (FPU), a physics processing unit (PPU), a tensor processing unit (TPU), a quantum processor, a microcontroller, and a combination thereof. Examples of the memory C2 can include a flash memory, a hard disk drive (HDD), a solid state drive (SSD), and a combination thereof.

The computer C may further include a random access memory (RAM) into which the program P is loaded at the time of execution and in which various kinds of data are temporarily stored. The computer C may further include a communication interface via which data is transmitted to and received from another apparatus. The computer C may further include an input-output interface via which input-output equipment such as a keyboard, a mouse, a display, or a printer is connected.

The program P can be recorded on a non-transitory tangible recording medium M capable of being read by the computer C. Examples of such a recording medium M can include a tape, a disk, a card, a semiconductor memory, and a programmable logic circuit. The computer C can obtain the program P via such a recording medium M. The program P can be transmitted via a transmission medium. Examples of such a transmission medium can include a communication network and a broadcast wave. The computer C can also obtain the program P via such a transmission medium.

Additional Remark

The whole or part of the example embodiments disclosed above can be described as, but not limited to, the following supplementary notes.
(Supplementary Note A1)

An information processing apparatus including: an accepting means for accepting an input of a query; a determining means for determining a generative model that is among a first generative model included in the information processing apparatus and a second generative model included in another apparatus and that is to be caused to generate content in accordance with the query; and a presenting means for presenting, to a user, the content generated according to determination by the determining means.
(Supplementary Note A2)

The information processing apparatus described in supplementary note A1, wherein the determining means determines, according to a status of communication with the another apparatus, the generative model that is to be caused to generate the content.
(Supplementary Note A3)

The information processing apparatus described in supplementary note A2, wherein, in a case where the status of communication is improved after the first generative model is caused to generate the content, the determining means determines that the second generative model is also to be caused to generate the content.
(Supplementary Note A4)

The information processing apparatus described in any one of supplementary notes A1 to A3, including a data acquiring means for acquiring user-related information related to the user, in a case where it is determined that the second generative model is to be caused to generate the content, the determining means transmitting the user-related information and the query to the another apparatus and causing the second generative model to generate the content in accordance with the user-related information.
(Supplementary Note A5)

The information processing apparatus described in supplementary note A1, wherein the determining means determines, according to details of the query, the generative model that is to be caused to generate the content.
(Supplementary Note A6)

The information processing apparatus described in any one of supplementary notes A1 to A5, wherein, in a case where the determining means determines that both the first generative model and the second generative model are to be caused to generate the content, the presenting means presents, during a period up to a time at which the content generated by the second generative model becomes available for presentation, the content generated by the first generative model.

(Supplementary Note A7)

The information processing apparatus described in supplementary note A1, wherein the determining means determines that the first generative model is to be caused to generate the content corresponding to a part of the query, and determines that the second generative model is to be caused to generate the content corresponding to another part of the query.

(Supplementary Note B1)

A control method including: an accepting process of accepting an input of a query; a determining process of determining a generative model that is among a first generative model and a second generative model and that is to be caused to generate content in accordance with the query; and a presenting process of presenting, to a user, the content generated according to determination in the determining process, the accepting process, the determining process, and the presenting process each being carried out by at least one processor.

(Supplementary Note B2)

The control method described in supplementary note B1, wherein in the determining process, the at least one processor determines, according to a status of communication with another apparatus including the second generative model, the generative model that is to be caused to generate the content.

(Supplementary Note B3)

The control method described in supplementary note B2, wherein, in a case where the status of communication is improved after the first generative model is caused to generate the content, the at least one processor determines that the second generative model is also to be caused to generate the content.

(Supplementary Note B4)

The control method described in any one of supplementary notes B1 to B3, further including a data acquiring process of acquiring user-related information related to the user, the data acquiring process being carried out by the at least one processor, in a case where the at least one processor has determined in the determining process that the second generative model is to be caused to generate the content, the at least one processor transmitting the user-related information and the query to another apparatus and causing the second generative model to generate the content in accordance with the user-related information.

(Supplementary Note B5)

The control method described in supplementary note B1, wherein in the determining process, the at least one processor determines, according to details of the query, the generative model that is to be caused to generate the content.

(Supplementary Note B6)

The control method described in any one of supplementary notes B1 to B5, wherein, in a case where it is determined that both the first generative model and the second generative model are to be caused to generate the content, the at least one processor carries out a process of presenting, during a period up to a time at which the content generated by the second generative model becomes available for presentation, the content generated by the first generative model.

(Supplementary Note B7)

The control method described in supplementary note B1, wherein in the determining process, the at least one processor determines that the first generative model is to be caused to generate the content corresponding to a part of the query, and determines that the second generative model is to be caused to generate the content corresponding to another part of the query.

(Supplementary Note C1)

A control program for causing a computer to function as: an accepting means for accepting an input of a query; a determining means for determining a generative model that is among a first generative model and a second generative model and that is to be caused to generate content in accordance with the query; and a presenting means for presenting, to a user, the content generated according to determination by the determining means.

(Supplementary Note C2)

The control program described in supplementary note C1, wherein the determining means determines, according to a status of communication with another apparatus, the generative model that is to be caused to generate the content.

(Supplementary Note C3)

The control program described in supplementary note C2, wherein, in a case where the status of communication is improved after the first generative model is caused to generate the content, the determining means determines that the second generative model is also to be caused to generate the content.

(Supplementary Note C4)

The control program described in any one of supplementary notes C1 to C3, wherein the computer is caused to function as a data acquiring means for acquiring user-related information related to the user, and the determining means which has determined that the second generative model is caused to generate the content transmits the user-related information and the query to another apparatus and causes the second generative model to generate the content in accordance with the user-related information.

(Supplementary Note C5)

The control program described in supplementary note C1, wherein the determining means determines, according to details of the query, the generative model that is to be caused to generate the content.

(Supplementary Note C6)

The control program described in any one of supplementary notes C1 to C5, wherein, in a case where the determining means has determined that both the first generative model and the second generative model are to be caused to generate the content, the presenting means presents, during a period up to a time at which the content generated by the second generative model becomes available for presentation, the content generated by the first generative model.

(Supplementary Note C7)

The control program described in supplementary note C1, wherein the determining means determines that the first generative model is to be caused to generate the content corresponding to a part of the query, and determines that the second generative model is to be caused to generate the content corresponding to another part of the query.

(Supplementary Note D1)

An information processing apparatus including at least one processor, the at least one processor carrying out: an accepting process of accepting an input of a query; a determining process of determining a generative model that is among a first generative model included in the information processing apparatus and a second generative model included in another apparatus and that is to be caused to generate content in accordance with the query; and a presenting process of presenting, to a user, the content generated according to determination in the determining process. (Supplementary Note D2)

The information processing apparatus described in supplementary note D1, wherein in the determining process, the at least one processor determines, according to a status of communication with the another apparatus, the generative model that is to be caused to generate the content. (Supplementary Note D3)

The information processing apparatus described in supplementary note D2, wherein, in a case where the status of communication is improved after the first generative model is caused to generate the content, the at least one processor determines that the second generative model is also to be caused to generate the content. (Supplementary Note D4)

The information processing apparatus described in any one of supplementary notes D1 to D3, wherein the at least one processor carries out a data acquiring process of acquiring user-related information related to the user, and the at least one processor which has determined that the second generative model is to be caused to generate the content transmits the user-related information and the query to the another apparatus and causes the second generative model to generate the content in accordance with the user-related information. (Supplementary Note D5)

The information processing apparatus described in supplementary note D1, wherein in the determining process, the at least one processor determines, according to details of the query, the generative model that is to be caused to generate the content. (Supplementary Note D6)

The information processing apparatus described in any one of supplementary notes D1 to D5, wherein, in a case where it is determined that both the first generative model and the second generative model are to be caused to generate the content, the at least one processor carries out a process of presenting, during a period up to a time at which the content generated by the second generative model becomes available for presentation, the content generated by the first generative model. (Supplementary Note D7)

The information processing apparatus described in supplementary note D1, wherein in the determining process, the at least one processor determines that the first generative model is to be caused to generate the content corresponding to a part of the query, and determines that the second generative model is to be caused to generate the content corresponding to another part of the query.

The information processing apparatus may further include a memory. The memory may store a control program for causing the at least one processor to carry out each of the processes. (Supplementary Note E1)

A non-transitory recording medium recording a control program which is a program for causing a computer to function as an information processing apparatus and which causes the computer to carry out: an accepting process of accepting an input of a query; a determining process of determining a generative model that is among a first generative model included in the information processing apparatus and a second generative model included in another apparatus and that is to be caused to generate content in accordance with the query; and a presenting process of presenting, to a user, the content generated according to determination in the determining process.

REFERENCE SIGNS LIST

1: Information processing apparatus
101: Accepting section (accepting means)
102: Determining section (determining means)
103: Presenting section (presenting means)
111: First generative model
112: Second generative model
2: First apparatus
3: Second apparatus
5: Content generation system
2A: Terminal (information processing apparatus, first apparatus)
101A: Accepting section (accepting means)
102A: Determining section (determining means)
103A: Presenting section (presenting means)
201A: Data acquiring section (related information acquiring means)
111A: First generative model
112A: Second generative model
3A: Generation apparatus (second apparatus)
5A: Content generation system

The invention claimed is:

1. An information processing apparatus comprising at least one processor, the at least one processor being configured to carry out:

an accepting process comprising accepting an input of a query;

a determining process comprising determining a generative model that is among a first generative model included in the information processing apparatus and a second generative model included in another apparatus and that is to be caused to generate content in accordance with the query; and a presenting process comprising presenting, to a user, the content generated according to determination in the determining process, wherein the determining process comprises:

monitoring, by the information processing apparatus, a status of communication with the another apparatus including the second generative model;

in a case where the status indicates either (i) an inability to communicate or (ii) degradation below a predetermined threshold including an average communication speed not more than the threshold, determining that the first generative model is to be caused to generate the content; and in a case where the status indicates successful communication capability, determining that the second generative model is to be caused to generate the content;

wherein, in a case where the status of communication improves after the first generative model has generated the content, the at least one processor further determines that the second generative model is also to be caused to generate the content, and wherein the presenting process includes presenting, during a period up to a time at which the content generated by the second generative model becomes available for presentation, the content generated by the first generative model and subsequently presenting the content generated by the second generative model.

2. The information processing apparatus according to claim 1, wherein:

the at least one processor further carries out a related information acquiring process comprising acquiring user-related information related to the user, and the at least one processor, which has determined in the determining process that the second generative model is to be caused to generate the content, transmits the user-related information and the query to the another apparatus and causes the second generative model to generate the content in accordance with the user-related information.

3. The information processing apparatus according to claim 1, wherein in the determining process, the at least one processor determines, according to details of the query, the generative model that is to be caused to generate the content.

4. The information processing apparatus according to claim 1, wherein in the presenting process, the at least one processor, which has determined in the determining process that both the first generative model and the second generative model are to be caused to generate the content, presents, during a period up to a time at which the content generated by the second generative model becomes available for presentation, the content generated by the first generative model.

5. The information processing apparatus according to claim 1, wherein in the determining process, the at least one processor determines that the first generative model is to be caused to generate the content corresponding to a part of the query, and determines that the second generative model is to be caused to generate the content corresponding to another part of the query.

6. A content generation system comprising:

a first apparatus including a first generative model; and a second apparatus including a second generative model, wherein the first apparatus is configured to execute:

a determining process comprising determining a generative model that is among the first generative model and the second generative model and that is to be caused to generate content in accordance with a query inputted to the content generation system; and a presenting process comprising presenting, to a user, the content generated according to the determining process by the first apparatus, wherein the determining process comprises:

monitoring, by the first apparatus, a status of communication with the second apparatus including the second generative model;

in a case where the status indicates either (i) an inability to communicate or (ii) degradation below a predetermined threshold including an average communication speed not more than the threshold, determining that the first generative model is to be caused to generate the content; and in a case where the status indicates successful communication capability, determining that the second generative model is to be caused to generate the content;

wherein the determining process further comprises, in a case where the status of communication improves after the first generative model has generated the content, determining that the second generative model is also to be caused to generate the content, and wherein the presenting process includes presenting, during a period up to a time at which the content generated by the second generative model becomes available for presentation, the content generated by the first generative model and subsequently presenting the content generated by the second generative model.

7. A control method wherein at least one processor of a first apparatus, carries out:

an accepting process comprising accepting an input of a query;

a determining process comprising determining a generative model that is among a first generative model included in the first apparatus and a second generative model included in a second apparatus, and that is to be caused to generate content in accordance with the query; and a presenting process comprising presenting, to a user, the content generated according to determination in the determining process, wherein the determining process comprises:

monitoring, by the first apparatus, a status of communication with the second apparatus including the second generative model;

in a case where the status indicates either (i) an inability to communicate or (ii) degradation below a predetermined threshold including an average communication speed not more than the threshold, determining that the first generative model is to be caused to generate the content; and in a case where the status indicates successful communication capability, determining that the second generative model is to be caused to generate the content;

wherein the determining process further comprises, in a case where the status of communication improves after the first generative model has generated the content, determining that the second generative model is also to be caused to generate the content, and wherein the presenting process includes presenting, during a period up to a time at which the content generated by the second generative model becomes available for presentation, the content generated by the first generative model and subsequently presenting the content generated by the second generative model.

* * * * *